US012534946B2

(12) United States Patent
Blum et al.

(10) Patent No.: US 12,534,946 B2
(45) Date of Patent: Jan. 27, 2026

(54) MOUNTING DEVICE FOR SUPPORTING AT LEAST ONE DOOR LEAF

(71) Applicant: Julius Blum GmbH, Hoechst (AT)

(72) Inventors: Lukas Blum, Bregenz (AT); Rainer Hollenstein, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 231 days.

(21) Appl. No.: 18/210,255

(22) Filed: Jun. 15, 2023

(65) Prior Publication Data

US 2023/0323720 A1 Oct. 12, 2023

Related U.S. Application Data

(63) Continuation of application No. PCT/AT2021/060475, filed on Dec. 14, 2021.

(30) Foreign Application Priority Data

Dec. 17, 2020 (AT) .............................. A 51105/2020

(51) Int. Cl.

*E05D 15/58* (2006.01)
*E05D 15/06* (2006.01)
*E06B 3/50* (2006.01)

(52) U.S. Cl.

CPC ......... *E05D 15/58* (2013.01); *E05D 15/0604* (2013.01); *E06B 3/5045* (2013.01); *E05Y 2900/212* (2013.01)

(58) Field of Classification Search

CPC ... E05D 15/58; E05D 15/0604; E06B 3/5045; E05Y 2900/212

(Continued)

(56) References Cited

U.S. PATENT DOCUMENTS 5,694,665 A 12/1997 Strickland et al.
6,336,248 B1 1/2002 Finkelstein et al.

(Continued)

FOREIGN PATENT DOCUMENTS

AT 521365 1/2020
CN 103443378 12/2013

(Continued)

OTHER PUBLICATIONS

International Search Report issued Apr. 4, 2022 in International (PCT) Application No. PCT/AT2021/060475.

*Primary Examiner* — Suzanne L Barrett

(74) *Attorney, Agent, or Firm* — Wenderoth, Lind & Ponack, L.L.P.

(57) ABSTRACT

Amounting device includes a support and a separate holding device. An installation device releasably secures the holding device to the support, and the holding device has at least two furniture hinges mutually spaced in the longitudinal direction of the holding device, and/or securing interfaces for securing furniture hinges. The door leaf can be supported on the holding device in an articulated manner by the furniture hinge, and the holding device includes a first mounting part, on which the at least two furniture hinges and/or securing interfaces are arranged, and a second mounting part to be arranged between the first mounting part and the support. The two mounting parts can be adjusted relative to each other, and the second mounting part can be adjusted relative to the support.

20 Claims, 7 Drawing Sheets

(58) Field of Classification Search
USPC ........................................................ 109/70
See application file for complete search history.

(56) References Cited

U.S. PATENT DOCUMENTS

| | | | | |
|---|---|---|---|---|
| 9,057,216 | B2 | 6/2015 | Bortoluzzi et al. | |
| 9,546,509 | B2 | 1/2017 | Siekierka et al. | |
| 10,676,974 | B2 * | 6/2020 | Wojdyla | A61G 3/062 |
| 10,876,340 | B2 | 12/2020 | Rupp et al. | |
| 11,274,482 | B2 | 3/2022 | Rupp et al. | |
| 11,629,540 | B2 | 4/2023 | Blum et al. | |
| 2004/0252045 | A1 * | 12/2004 | Wu | E05D 15/58 341/176 |
| 2010/0269291 | A1 | 10/2010 | Haab et al. | |
| 2013/0232878 | A1 | 9/2013 | Bortoluzzi et al. | |
| 2014/0082887 | A1 | 3/2014 | Siekierka et al. | |
| 2014/0150208 | A1 | 6/2014 | Haab et al. | |
| 2016/0047151 | A1 * | 2/2016 | Pelekanos | E05D 11/0054 16/237 |
| 2019/0284859 | A1 | 9/2019 | Rupp et al. | |
| 2019/0301216 | A1 * | 10/2019 | Rupp | E05D 15/26 |
| 2019/0301218 | A1 * | 10/2019 | Rupp | E05D 15/58 |
| 2019/0330896 | A1 | 10/2019 | Rupp et al. | |
| 2020/0018107 | A1 * | 1/2020 | Rupp | E05F 3/14 |
| 2020/0018108 | A1 * | 1/2020 | Sperger | E05D 15/58 |
| 2020/0048946 | A1 * | 2/2020 | Blum | E05D 15/26 |
| 2021/0262269 | A1 | 8/2021 | Goetz | |
| 2021/0310293 | A1 | 10/2021 | Blum et al. | |

FOREIGN PATENT DOCUMENTS

| | | | |
|---|---|---|---|
| CN | 103850554 | 6/2014 | |
| CN | 207829674 | 9/2018 | |
| DE | 10 2008 003 557 | 7/2009 | |
| EP | 2 246 509 | 11/2010 | |
| EP | 2 420 643 | 2/2012 | |
| JP | 11-36689 | 2/1999 | |
| JP | 2014-515442 | 6/2014 | |
| JP | 2022-514898 | 2/2022 | |
| WO | 2018/129570 | 7/2018 | |
| WO | 2018/129572 | 7/2018 | |
| WO | 2020/097639 | 5/2020 | |
| WO | 2020/124108 | 6/2020 | |
| WO | WO-2025050149 A1 * | 3/2025 | E05D 15/06 |

* cited by examiner

Fig. 3a
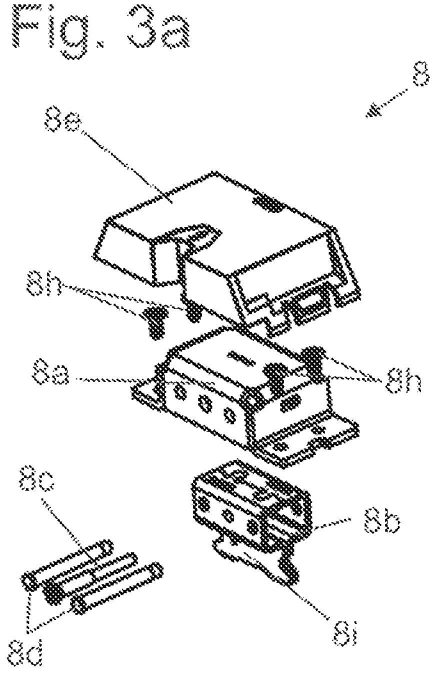
Fig. 3b
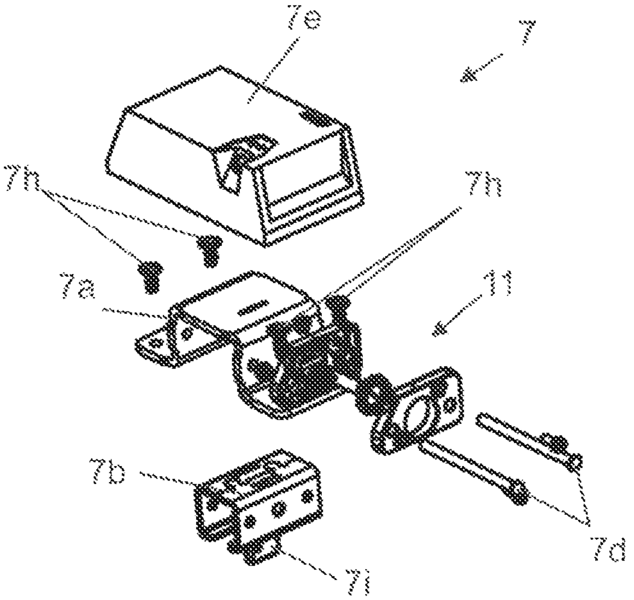
Fig. 3c
Fig. 3d
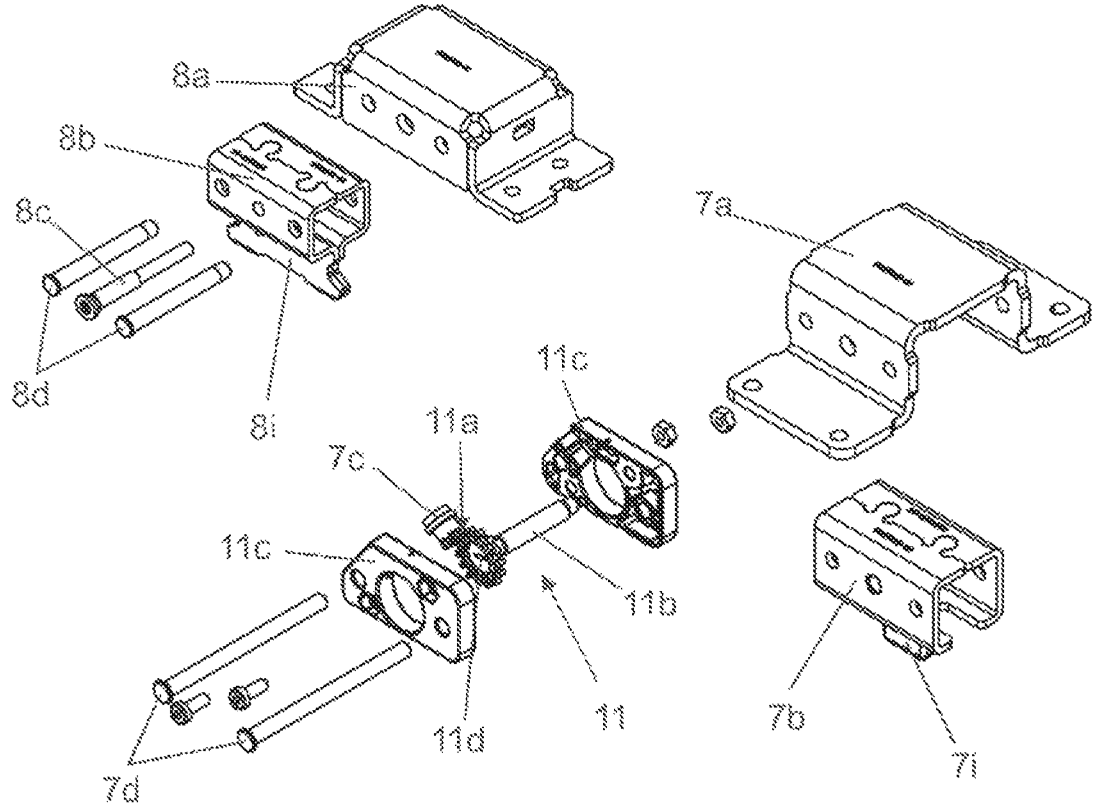

MOUNTING DEVICE FOR SUPPORTING AT LEAST ONE DOOR LEAF

BACKGROUND OF THE INVENTION

The invention relates to a mounting device for supporting at least one door leaf. The invention furthermore relates to a guide system for guiding at least one door leaf relative to a furniture carcass with at least one mounting device according to the invention, and to a piece of furniture with a furniture carcass and at least one door leaf with at least one guide system according to the invention.

Mounting devices for supporting at least one door leaf are already known. In the case of mounting devices known from the state of the art, it is often not possible to adjust a holding device. Accordingly, a door leaf arranged on the holding device via hinges is also not settable with respect to a furniture body.

The applicant's A 51143/2018 therefore proposes two setting devices, via which the holding device is settable relative to a support. The holding device can be set in a direction along and transverse to a longitudinal direction of the support via a first of the two setting devices and only transverse to the longitudinal direction of the support via a second of the two setting devices.

A disadvantage of such a solution according to the state of the art is that the holding device is not settable independently in a direction along and a direction transverse to the longitudinal direction of the support. Furthermore, the two setting devices cannot be actuated from one side, which makes a setting operation more difficult.

SUMMARY OF THE INVENTION

The object of the present invention is to at least partially avoid the described disadvantages according to the state of the art and to specify a mounting device for supporting at least one door leaf that is improved compared with the state of the art, a guide system with such a mounting device, and a piece of furniture with such a guide system.

According to the invention, the at least one holding device comprises at least one first mounting part, on which the at least two furniture hinges and/or fastening interfaces are arranged, and at least one second mounting part, which can be or is arranged between the at least one first mounting part and the at least one support, wherein the two mounting parts are settable relative to one another and the at least one second mounting part is settable relative to the at least one support.

The holding device is thereby easily settable in a direction along and, independently thereof, in a direction transverse to a longitudinal direction of the support.

A guide system according to the invention comprises at least one mounting device according to the invention, at least one, preferably at least two, support guide rail, and at least one guide device, via which the at least one support can be or is supported displaceable on the at least one support guide rail, preferably in a direction substantially transverse to the longitudinal direction of the at least one holding device.

With regard to a piece of furniture according to the invention, the piece of furniture has at least one guide system according to the invention, preferably wherein at least one shaft-shaped cavity is provided, in which the at least one door leaf can be sunk.

At least one, preferably precisely one, vertical setting device can preferably be provided, with which the at least one second mounting part is settable relative to the at least one support in a direction substantially parallel to the longitudinal direction of the at least one holding device.

Via the vertical setting device, it is thus possible to adjust the holding device, and therefore also the door leaf, relative to the at least one support substantially parallel to the longitudinal direction of the at least one holding device, thus substantially in a horizontal direction.

The door leaf can therefore be easily adapted to a furniture carcass or the like in a horizontal direction.

Preferably, at least one, preferably precisely two, lateral setting device is provided, with which the at least one first mounting part is settable relative to the at least one second mounting part in a direction substantially transverse to the longitudinal direction of the at least one holding device.

Via the lateral setting device, it is thus possible to adjust the at least one first mounting part of the holding device, and therefore also the door leaf, relative to the at least one second mounting part, and thus relative to the support, substantially transverse to the longitudinal direction of the at least one holding device, thus substantially in a vertical direction.

The door leaf can therefore be easily adapted to a furniture carcass or the like in a vertical direction.

An ideal compromise between a simple structure and the greatest possible stability during an adjustment operation is achieved in particular if precisely two lateral setting devices are provided.

It is advantageous if the vertical setting device and/or the lateral setting device in each case have at least one setting element, wherein all setting elements are actuatable from the same direction, preferably substantially transverse to the longitudinal direction of the at least one holding device.

This simplifies the actuation of the vertical and/or lateral setting device in an installed state of a device according to the invention. The actuation of the vertical and lateral setting devices is additionally made easier if the at least one setting element is formed screw-shaped and/or has a screw head drive.

In an embodiment of the invention, the at least one installation device comprises at least two screw connections. This represents an uncomplicated and cost-effective possibility for releasably fastening the holding device to the at least one support.

Advantageously, the at least one first mounting part is supported on the at least one second mounting part displaceable, preferably to a limited extent, in a direction substantially transverse to the longitudinal direction of the at least one holding device, preferably via at least one peg, which is supported in at least one elongated hole.

The at least one first mounting part, the at least one second mounting part, and/or the at least one support can be formed beam-shaped and/or strip-shaped.

With regard to a guide system according to the invention, at least one further guide rail can be provided, which can be or is arranged substantially transverse to the support guide rail, wherein at least one carriage is provided, with which a second door leaf, which is or can be connected in an articulated manner to the at least one door leaf, which can be arranged on the at least one support, can be or is supported on the at least one further guide rail.

BRIEF DESCRIPTION OF THE DRAWINGS

Further details and advantages of the invention will be explained in more detail below on the basis of the description of the invention with reference to the drawings, in which:

FIG. 3*a* is an exploded representation of a lateral setting device according to the invention, FIG. 3*b* is an exploded representation of a vertical setting device according to the invention, FIG. 3*c* is an exploded representation of an adjustment mechanism of a lateral setting device according to the invention, FIG. 3*d* is an exploded representation of an adjustment mechanism of a vertical setting device according to the invention.

DETAILED DESCRIPTION OF THE INVENTION

Figure 1A:
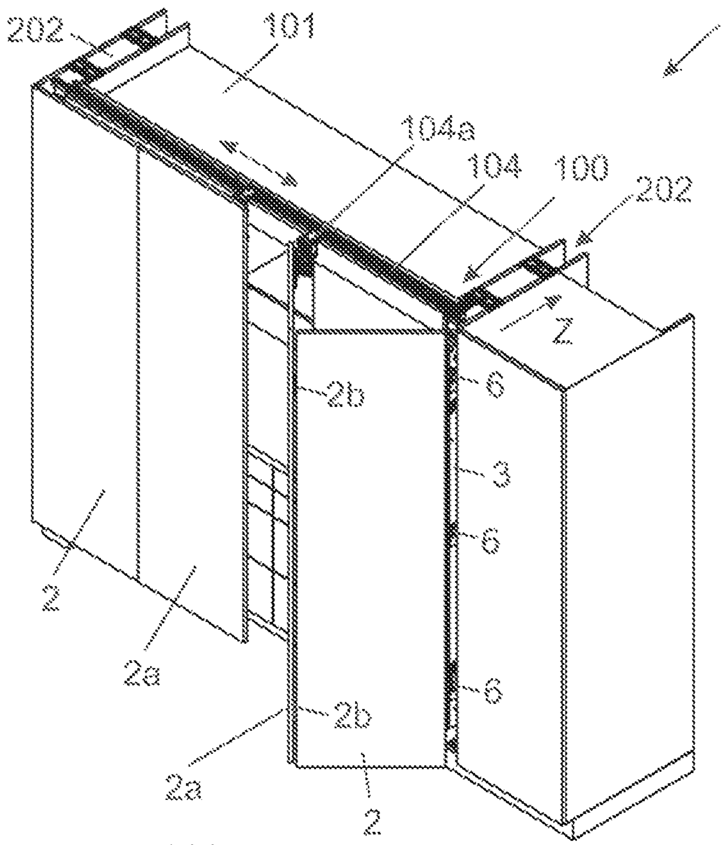
FIG. 1*a* is a perspective view of a piece of furniture according to the invention in a first door position.

FIG. 1*a* shows a perspective view of a piece of furniture 200 according to the invention in a first door position, with a furniture carcass 101 and a door leaf 2 movable relative thereto. A further door leaf 2*a* is arranged on the door leaf 2 via door leaf hinges 2*b*.

The door leaves 2, 2*a* are supported movable by a guide system 100 in each case between a first position, in which the door leaves 2, 2*a* are oriented substantially coplanar with respect to one another, and a second position, in which the door leaves 2, 2*a* are oriented substantially parallel to one another. In a second (parallel) position, the door leaves 2, 2*a* can be pushed into lateral cavities 202 of the furniture carcass 101. The guide system 100 comprises a guide rail 104, wherein a guide carriage 104*a* that can be connected to the second door leaf 2*a* is supported movable along the guide rail 104.

It can be seen that the right-hand door leaves 2, 2*a* are in an angled position relative to one another. The door leaf 2 is supported, via three or more furniture hinges 6, on a support 3, which can be pushed along a support guide rail 102, not visible, into the cavity in a depth direction (Z).

In the figure shown, the support 3 is in a transfer position, in which the support 3 adjoins the guide rail 104, with the result that the guide carriage 104*a* can be transferred back and forth between the guide rail 104 and the support 3. In the transfer position shown, the support 3 is releasably locked to the guide rail 104, wherein the locking between the guide rail 104 and the support 3 is releasable by entry of the guide carriage 104*a* into or onto the support 3. The support 3 is formed in the shape of an elongate column, the length of which corresponds at least to half of the vertical of the door leaves 2, 2*a*.

Figure 1B:
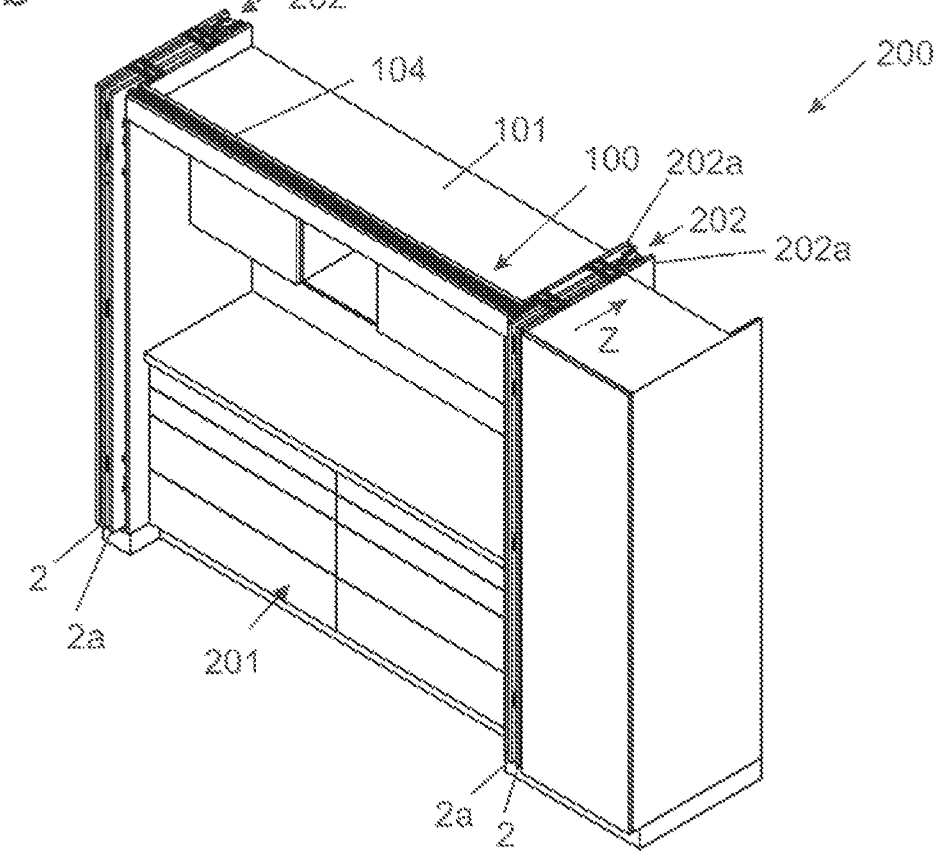
FIG. 1*b* is a perspective view of a piece of furniture according to the invention in a second door position.

FIG. 1*b* shows the piece of furniture 200 with the door leaves 2, 2*a*, which are now in a fully pushed-in state in the cavity 202. The door leaves 2, 2*a* can thus be transferred by the guide system 100 between a coplanar position and a second position according to FIG. 1*b*, in which the door leaves 2, 2*a* are oriented substantially parallel to one another and can be received within the cavity 202.

In this way, an interior 201 of the furniture carcass 101, for example in the form of a kitchen, can be completely covered, with the result that the interior 201 can be visually separated from a remaining area of a living space. In the embodiment shown, the cavity 202 is formed by two side walls 202*a*, wherein the door leaves 2, 2*a*, in a parallel position with respect to one another, can be pushed in between the side walls 202*a*.

Figure 2A:
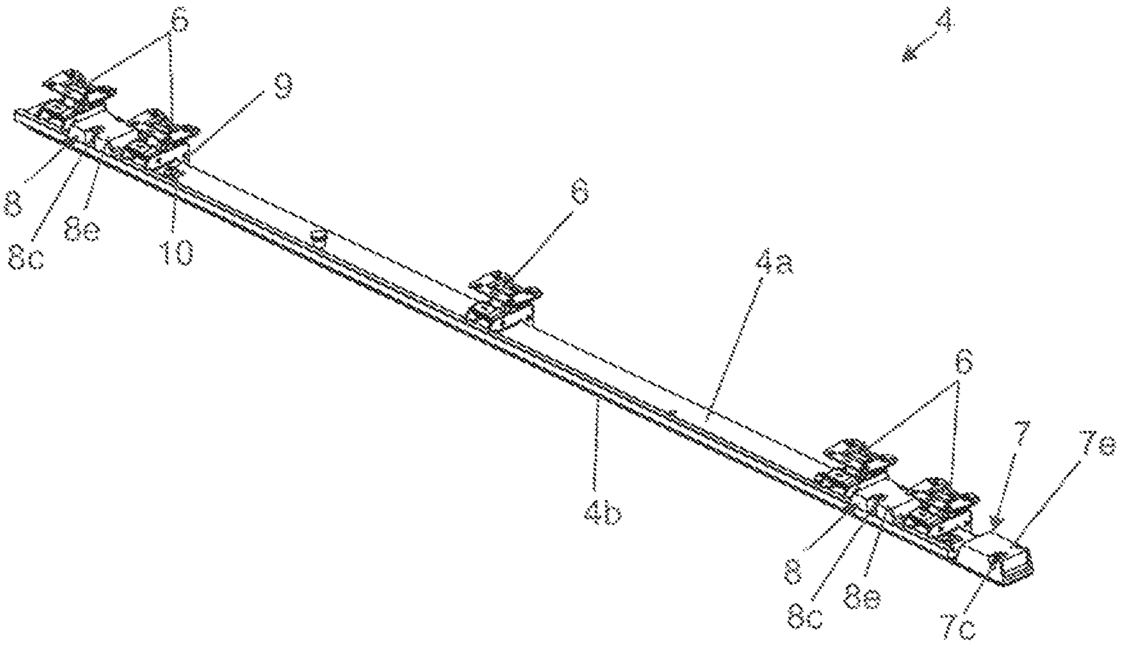
FIG. 2*a* is a perspective view of a holding device according to the invention.
Figure 2B:
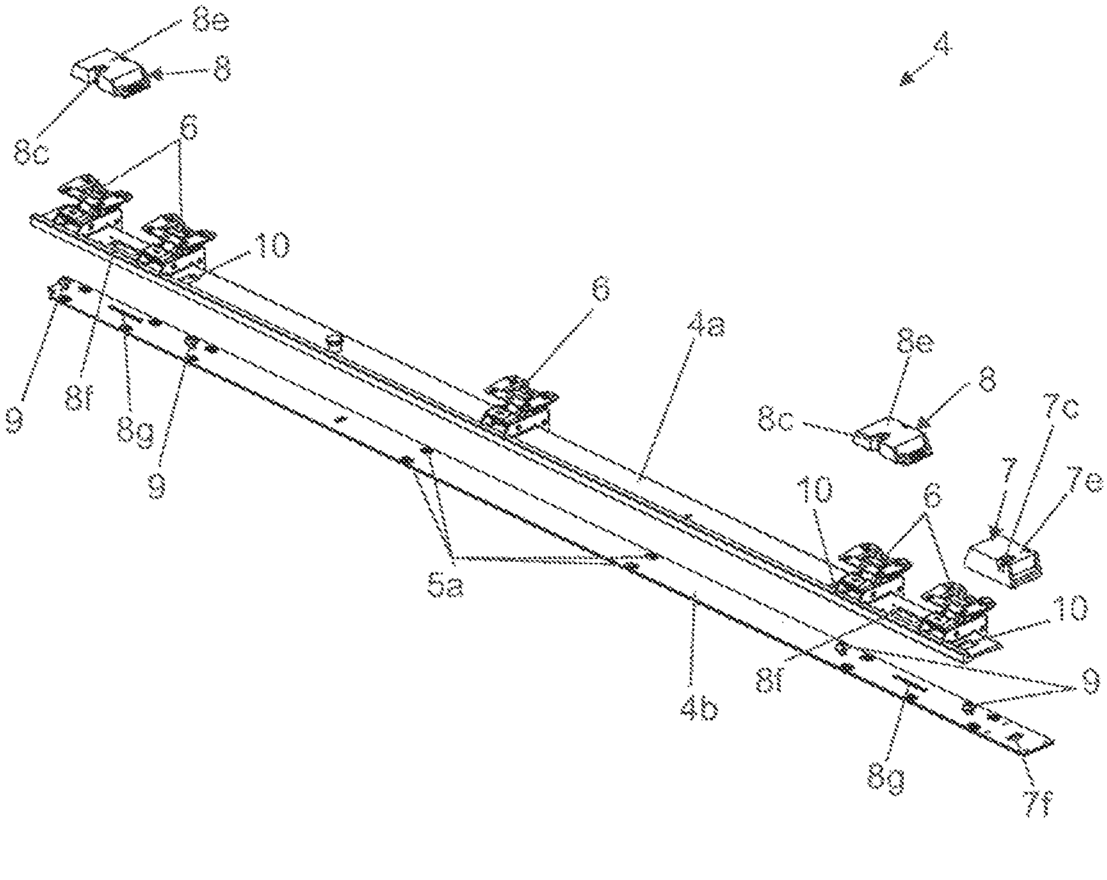
FIG. 2*b* is a partial exploded representation of a holding device according to the invention in a perspective view.

FIG. 2*a* shows a perspective view of a holding device 4 according to the invention, and FIG. 2*b* shows a partial exploded representation of a holding device 4 according to the invention in a perspective view.

A first mounting part 4*a* and a second mounting part 4*b* can be seen. On the first mounting part 4*a*, several furniture hinges 6 are arranged, on which in turn a door leaf 2 can be arranged. It can also be provided that the first mounting part 4*a* has, instead of the furniture hinges 6, fastening interfaces for the fastening of furniture hinges 6. The mounting part 4*a* is supported displaceable on the mounting part 4*b* via elongated holes and pegs 9, wherein the elongated holes 10 and pegs 9 simultaneously also limit a relative movement of the first mounting part 4*a* with respect to the second mounting part 4*b*.

Lateral setting devices 8 are arranged on the mounting part 4*a*. The lateral setting devices 8 in each case have a housing 8*e*, which protects the lateral setting devices 8 against external influences. Setting elements 7*c*, 8*c* are accessible from outside the housing 7*e*, 8*e* and are actuatable from the same direction.

Via passage openings 8*f*, an actuating element 8*b*, not visible, of a lateral setting device 8 can engage in one of the slots 8*g*. The lateral setting devices 8 are thereby connected to the second mounting part 4*b*.

On the second mounting part 4*b*, a vertical setting device 7 is arranged, which in turn comprises a housing 7*e*. The second mounting part 4*b* has a passage opening 7*f*, via which an actuating element 7*b*, not visible, of the vertical setting device 7 can engage in a slot 7*g* on the support 3. The vertical setting device 7 is thereby connected to the support 3.

The second mounting part 4*b* furthermore has a part of an installation device 5, which is implemented in the form of screw connections. The installation device 5 can in principle be implemented by any suitable form of connection, for example by detent connectors.

FIG. 3*a* shows an exploded representation of a lateral setting device 8 according to the invention, and FIG. 3*c* shows an exploded representation of an adjustment mechanism of such a lateral setting device 8.

The adjustment mechanism of the lateral setting device 8 substantially comprises a main element 8*a*, an actuating element 8b, guide elements 8d and a setting element 8c. The guide elements 8d guide the actuating element 8b during a movement relative to the main element 8a, with the result that the actuating element 8b does not become jammed or the like.

In the present embodiment, the setting element 8c is formed screw-shaped and has a screw head drive. A thread, not represented, on the setting element 8c is in engagement with a thread, not represented, on the actuating element 8b. The setting element 8c is supported rotatable on the main element 8a.

Through the threaded coupling of the setting element 8c to the actuating element 8b, a rotation of the setting element 8c results in a displacement of the actuating element 8b relative to the main element 8a in a direction parallel to a longitudinal extent of the setting element 8c.

The actuating element 8b can thus be set relative to the main element 8a by actuation of the setting element 8c. The main element 8a is arranged on the first mounting part 4a via screws 8h. Other types of connection, for example rivets, are also possible.

The protrusion 8i of the actuating element 8b is in engagement with a slot 8g in the second mounting part 4b. An actuation of the setting element 8c therefore also results in a displacement of the first mounting part 4a relative to the second mounting part 4b. The first mounting part 4a is thus settable relative to the second mounting part 4b by the lateral setting device 8.

The adjustment mechanism of the lateral setting device 8 is arranged at least partially in a housing 8e. The setting element 8c is accessible from outside the housing.

FIG. 3b shows an exploded representation of a vertical setting device 7 according to the invention, and FIG. 3d shows an exploded representation of an adjustment mechanism of such a vertical setting device 7.

The adjustment mechanism of the vertical setting device 7 substantially comprises a main element 7a, an actuating element 7b, guide elements 7d and a setting element 7c. The vertical setting device 7 furthermore has a deflection device 11. The guide elements 8d guide the actuating element 8b during a movement relative to the main element 8a, with the result that the actuating element 8b does not become jammed or the like.

In the present embodiment, the setting element 7c has a screw head drive and a tooth system. Here, the tooth system is in engagement with a tooth system of a deflection drive 11b. The two tooth systems form an angular gear mechanism 11a. By means of the angular gear mechanism 11a, a rotational movement of the setting element 7c is deflected through 90° to the deflection drive 11b. The deflection drive 11b can also be actuated directly via a screw head drive 11d on the deflection drive 11b.

A thread, not represented, on the deflection drive 11b is in engagement with a thread, not represented, on the actuating element 7b. The setting element 7c is supported rotatable on a deflection housing 11c, which at least partially encloses the deflection device 11, and on the main element 7a.

Through the threaded coupling of the deflection drive 11b to the actuating element 7b and the angular gear mechanism 11a, a rotation of the setting element 7c results in a displacement of the actuating element 7b relative to the main element 7a in a direction transverse to a longitudinal extent of the setting element 7c.

The actuating element 7b can thus be set relative to the main element 7a by actuation of the setting element 7c. The main element 7a is arranged on the second mounting part 4a via screws 7h. Other types of connection, for example rivets, are also possible.

The protrusion 7i of the actuating element 7b is in engagement with a slot 7g in the support 3. An actuation of the setting element 7c therefore also results in a displacement of the second mounting part 4b relative to the support 3. The second mounting part 4b is thus settable relative to the support 3 by the vertical setting device 7.

The adjustment mechanism of the vertical setting device 7 is arranged at least partially in a housing 7e. The setting element 7c is accessible from outside the housing.

Figure 4A:
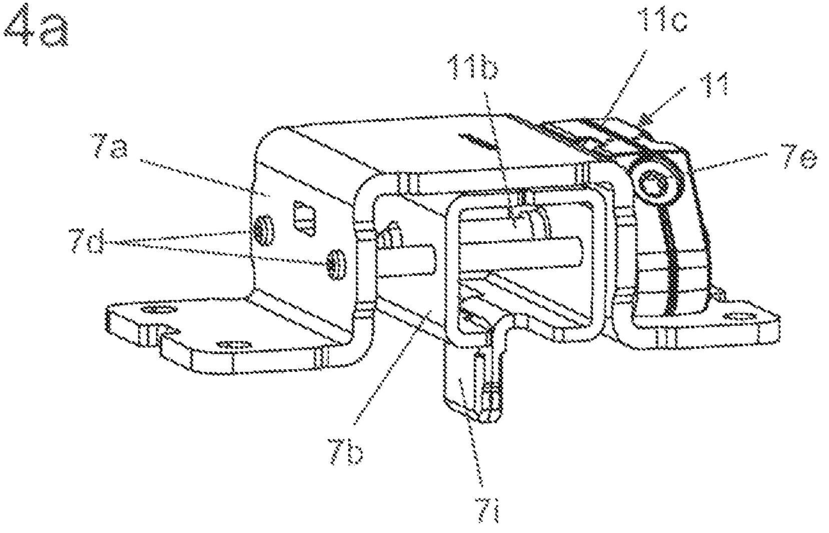
FIG. 4*a* shows an adjustment mechanism of a vertical setting device according to the invention in a first position.
Figure 4B:
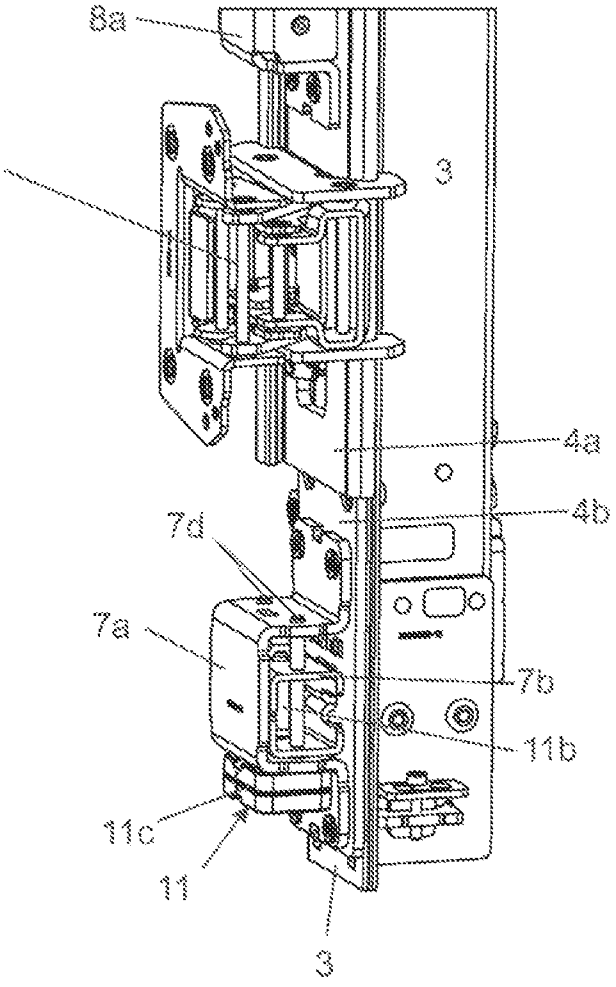
FIG. 4*b* shows a detail of a mounting device according to the invention in a first position of an adjustment mechanism of a vertical setting device according to the invention.

FIG. 4a shows an adjustment mechanism of a vertical setting device 7 according to the invention in a first position, and FIG. 4b shows an associated detail of a mounting device 1 according to the invention. The housing 7e is not represented.

It can be seen that the setting element 7b is in a position relative to the main element 7a in which the second mounting part 4b, and thus also the first mounting part 4a, has a greatest possible displacement upward with respect to the support 3. The actual magnitude of the greatest possible displacement can vary depending on the embodiment of the invention and can be greater or less than that shown here.

Figure 4C:
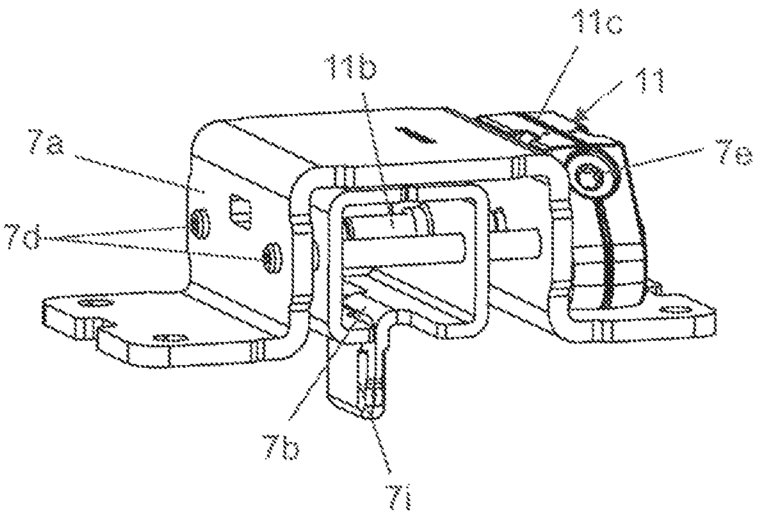
FIG. 4*c* shows an adjustment mechanism of a vertical setting device according to the invention in a second position.
Figure 4D:
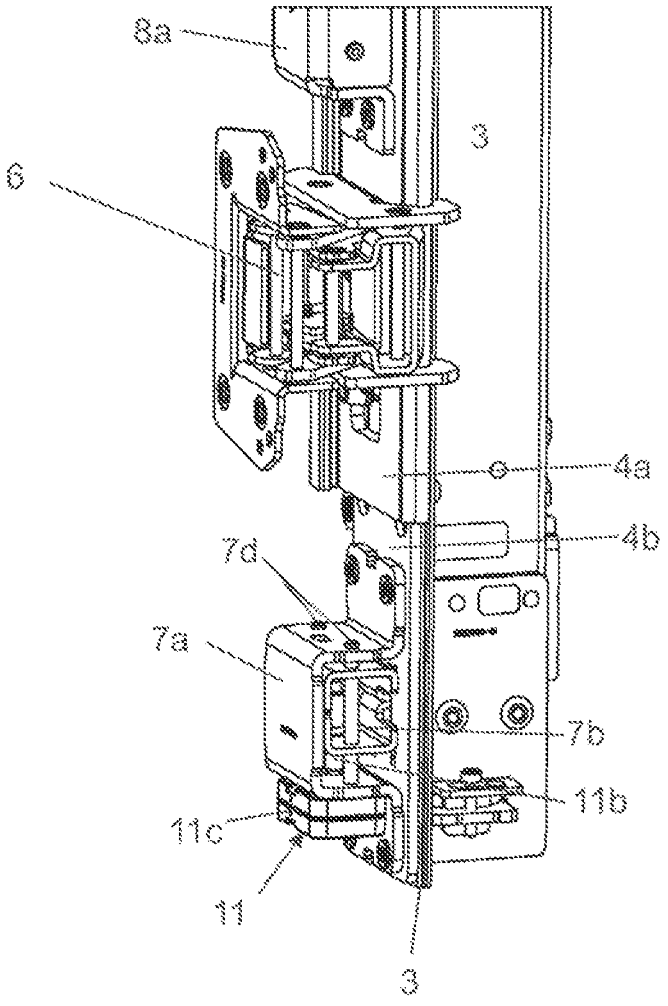
FIG. 4*d* shows a detail of a mounting device according to the invention in a second position of an adjustment mechanism of a vertical setting device according to the invention.

FIG. 4c shows an adjustment mechanism of a vertical setting device 7 according to the invention in a second position, and FIG. 4d shows an associated detail of a mounting device 1 according to the invention. The housing 7e is not represented.

It can be seen that the setting element 7c has been actuated and the actuating element 7b has changed its position relative to the main element 7a. The position of the second mounting part 4b, and thus also of the first mounting part 4a, with respect to the support 3 has therefore also changed. The second mounting part 4b now has a smaller displacement along a vertical with respect to the support 3 than in FIG. 4b.

Figure 5A:
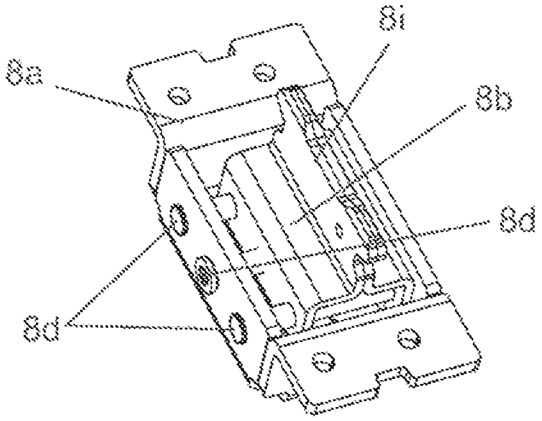
FIG. 5*a* shows an adjustment mechanism of a lateral setting device according to the invention in a first position.
Figure 5B:
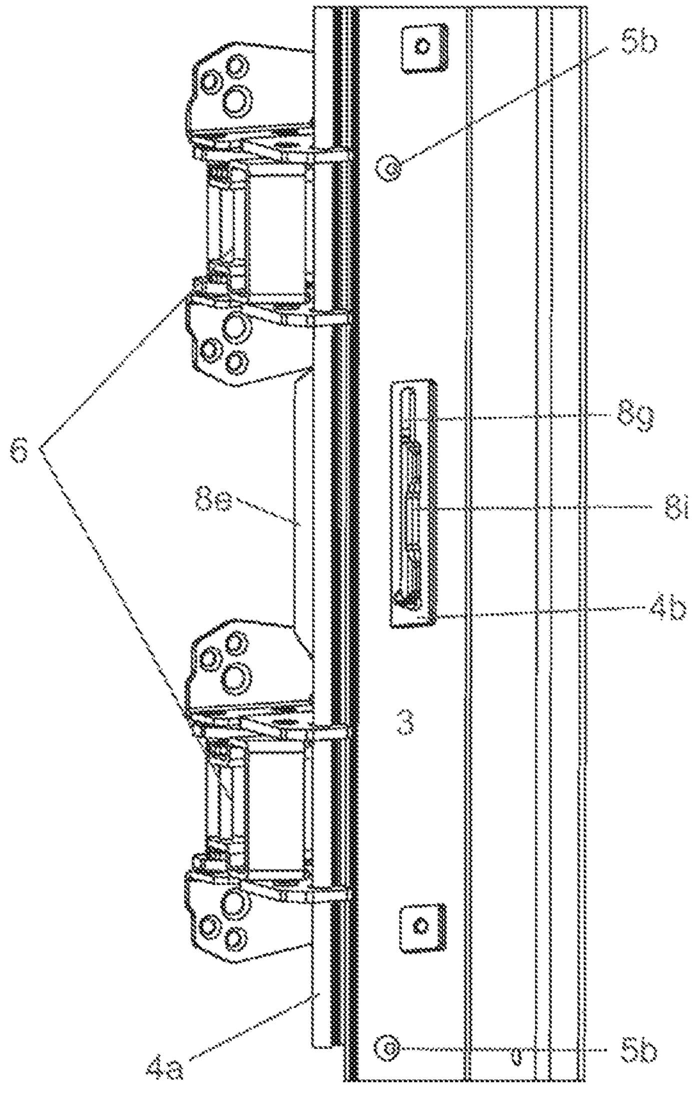
FIG. 5*b* shows a detail of a mounting device according to the invention in a first position of an adjustment mechanism of a lateral setting device according to the invention.

FIG. 5a shows an adjustment mechanism of a lateral setting device 8 according to the invention in a first position, and FIG. 5b shows an associated detail of a mounting device 1 according to the invention. The housing 8e is not represented.

It can be seen that the setting element 8b is in a position relative to the main element 8a in which the first mounting part 4a has only a small displacement with respect to the second mounting part 4b. The actual magnitude of the displacement can vary depending on the embodiment of the invention and can be greater or less than that shown here.

Figure 5C:
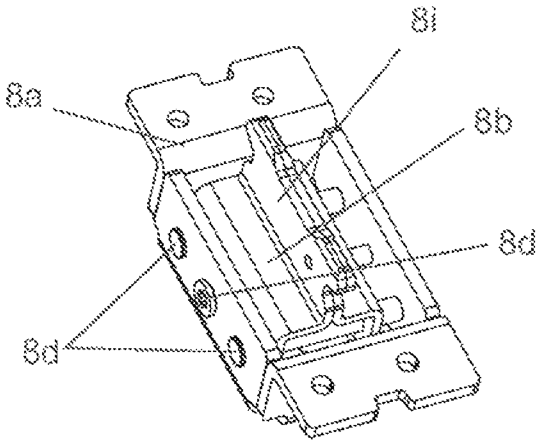
FIG. 5*c* shows an adjustment mechanism of a lateral setting device according to the invention in a second position.
Figure 5D:
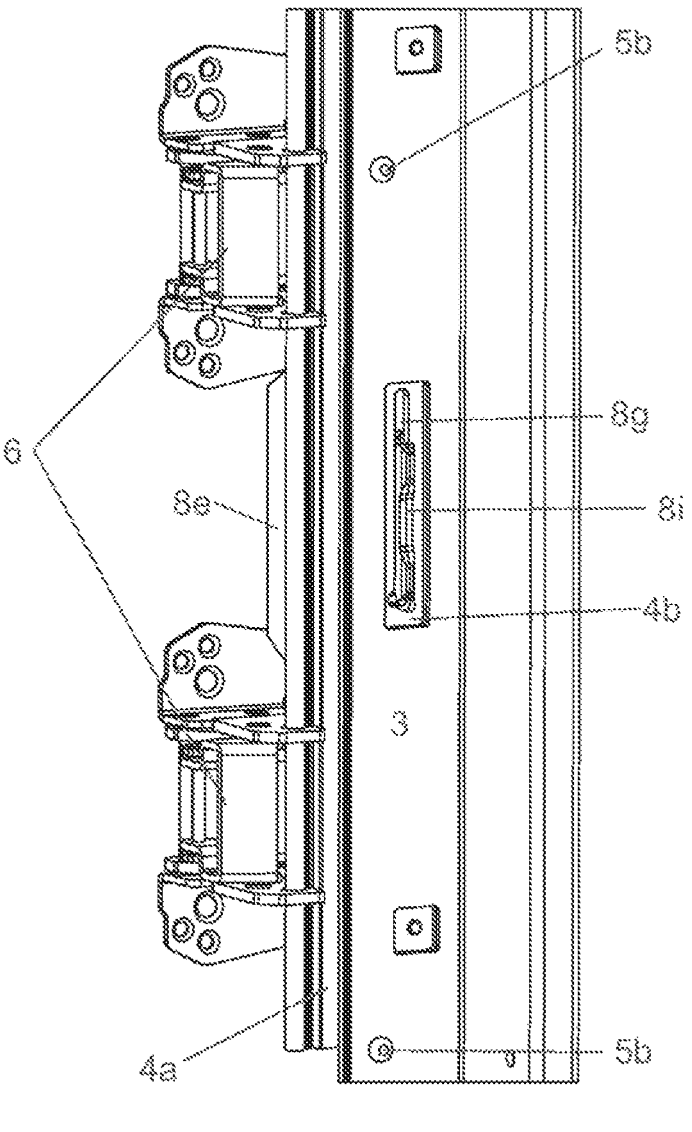
FIG. 5*d* shows a detail of a mounting device according to the invention in a second position of an adjustment mechanism of a lateral setting device according to the invention.

FIG. 5c shows an adjustment mechanism of a lateral setting device 8 according to the invention in a second position, and FIG. 5d shows an associated detail of a mounting device according to the invention. The housing 8e is not represented.

It can be seen that the setting element 8c has been actuated and the actuating element 8b has changed its position relative to the main element 8a. The position of the first mounting part 4b relative to the second mounting part 4b has therefore also changed. The first mounting part 4a now has a greater displacement with respect to the second mounting part 5b than in FIG. 5b.

LIST OF REFERENCE NUMBERS

1 mounting device
2 door leaf
  2a second door leaf
  2b door leaf hinge
3 support

4 holding device
4*a* first mounting device
4*b* second mounting device
5 installation device
6 furniture hinge
7 vertical setting device
7*a* main element
7*b* actuating element
7*c* setting element
7*d* guide element
7*e* housing
7*f* passage opening
7*g* slot
7*h* screws
7*i* protrusion
8 lateral setting device
8*a* main element
8*b* actuating element
8*c* setting element
8*d* guide element
8*e* housing
8*f* passage opening
8*g* slot
8*h* screws
8*i* protrusion
9 peg
10 elongated hole
11 deflection device
11*a* bevel gear mechanism
11*b* deflection drive
11*c* deflection housing
11*d* screw head drive
100 guide system
101 furniture carcass
102 support guide rail
103 guide device
104 guide rail
104*a* guide carriage
200 piece of furniture
201 interior
202 cavity

The invention claimed is:

1. A mounting device for supporting at least one door leaf, comprising:

at least one support;

at least one holding device separate from the at least one support; and at least one installation device with which the at least one holding device is releasably fastenable to the at least one support, wherein the at least one holding device has at least two furniture hinges which are spaced apart from one another in a longitudinal direction of the at least one holding device, wherein the at least one holding device is configured to support the at least one door leaf in an articulated manner by means of the at least two furniture hinges, wherein the at least one holding device comprises a first mounting part, on which the at least two furniture hinges are arranged, and a second mounting part which is arranged between the first mounting part and the at least one support, wherein positions of the first and second mounting parts are settable relative to one another and a position of the second mounting part is settable relative to the at least one support.

2. The mounting device according to claim 1, further comprising at least one vertical setting device with which a position of the second mounting part is settable relative to the at least one support in a direction substantially parallel to the longitudinal direction of the at least one holding device.

3. The mounting device according to claim 2, wherein the at least one vertical setting device comprises a main element and an actuating element, wherein a position of the actuating element is settable relative to the main element.

4. The mounting device according to claim 3, wherein the main element is connected to one of the first and second mounting parts and the actuating element is connected to the other of the first and second mounting parts.

5. The mounting device according to claim 3, wherein the at least one vertical setting device comprises at least one guide element for guiding the actuating element.

6. The mounting device according to claim 1, further comprising at least one lateral setting device with which a position of the first mounting part is settable relative to the second mounting part in a direction substantially transverse to the longitudinal direction of the at least one holding device.

7. The mounting device according to claim 6, wherein the at least one lateral setting device comprises a main element and an actuating element, wherein a position of the actuating element is settable relative to the main element.

8. The mounting device according to claim 7, wherein the main element is connected to one of the first and second mounting parts and the actuating element is connected to the other of the first and second mounting parts.

9. The mounting device according to claim 1, wherein the at least one lateral setting device comprises at least one guide element for guiding the actuating element.

10. The mounting device according to claim 2, further comprising at least one lateral setting device with which a position of the first mounting part is settable relative to the second mounting part in a direction substantially transverse to the longitudinal direction of the at least one holding device, wherein the at least one vertical setting device and the at least one lateral setting device each have a setting element, wherein the setting elements of the at least one vertical setting device and the at least one lateral setting device are actuatable from the same direction.

11. The mounting device according to claim 10, wherein the setting elements of the at least one vertical setting device and the at least one lateral setting device are formed screw-shaped or have a screw head drive.

12. A mounting device for supporting at least one door leaf, comprising:

at least one support;

at least one holding device separate from the at least one support; and at least one installation device with which the at least one holding device is releasably fastenable to the at least one support, wherein the at least one holding device has at least two furniture hinges which are spaced apart from one another in a longitudinal direction of the at least one holding device, wherein the at least one holding device is configured to support the at least one door leaf in an articulated manner by means of the at least two furniture hinges, wherein the at least one holding device comprises a first mounting part, on which the at least two furniture hinges are arranged, and a second mounting part which is arranged between the first mounting part and the at least one support, wherein positions of the first and second mounting parts are settable relative to one another and a position of the second mounting part is settable relative to the at least one support, and wherein the second mounting part is supported on the at least one support so as to be displaceable relative to the at least one support in a direction substantially parallel to the longitudinal direction of the at least one holding device.

13. The mounting device according to claim 1, wherein the at least one installation device comprises at least two screw connections.

14. The mounting device according to claim 1, wherein the first mounting part is supported on the second mounting part so as to be displaceable relative to the second mounting part in a direction substantially transverse to the longitudinal direction of the at least one holding device.

15. The mounting device according to claim 1, wherein the first mounting part, the second mounting part or the at least one support is formed so as to be beam-shaped or strip-shaped.

16. A guide system for guiding at least one first door leaf relative to a furniture carcass, comprising:

the mounting device according to claim 1;

at least one support guide rail; and at least one guide device, with which the at least one support is supported so as to be displaceable on the at least one support guide rail.

17. The guide system according to claim 16, further comprising:

at least one further guide rail arranged substantially transverse to the at least one support guide rail; and at least one carriage that is supported on the at least one further guide rail, wherein the at least one carriage is configured to be connected to a second door that is connected in an articulated manner to the at least one first door leaf which is arranged on the at least one support.

18. A piece of furniture comprising:

a furniture carcass;

at least one door leaf; and the guide system according to claim 16, wherein the furniture carcass has at least one interior, and the at least one door leaf is configured to at least partially cover the at least one interior.

19. The mounting device according to claim 10, wherein the setting elements of the at least one vertical setting device and the at least one lateral setting device are actuatable from a direction substantially transverse to the longitudinal direction of the at least one holding device.

20. The mounting device according to claim 14, wherein the first mounting part is supported on the second mounting part so as to be displaceable relative to the second mounting part via at least one peg which is mounted in at least one elongated hole.

* * * * *